(12) United States Patent
Firth

(10) Patent No.: US 9,126,274 B2
(45) Date of Patent: Sep. 8, 2015

(54) SAW WITH CIRCULAR BLADE

(71) Applicant: Power Box AG, Zug (CH)

(72) Inventor: Robert Firth, Pocklington (GB)

(73) Assignee: Power Box AG, Zug (CH)

( * ) Notice: Subject to any disclaimer, the term of this patent is extended or adjusted under 35 U.S.C. 154(b) by 0 days.

(21) Appl. No.: 14/096,583

(22) Filed: Dec. 4, 2013

(65) Prior Publication Data

US 2014/0090534 A1 Apr. 3, 2014

Related U.S. Application Data

(62) Division of application No. 12/669,244, filed as application No. PCT/GB2008/002439 on Jul. 16, 2008, now abandoned.

(30) Foreign Application Priority Data

Jul. 17, 2007 (GB) .................................. 0713817.5

(51) Int. Cl.
*B23D 47/02* (2006.01)
*B23D 45/04* (2006.01)
*B23D 47/00* (2006.01)
*B27B 5/29* (2006.01)

(52) U.S. Cl.
CPC .............. *B23D 47/02* (2013.01); *B23D 45/048* (2013.01); *B23D 47/00* (2013.01); *B27B 5/29* (2013.01); *Y10T 83/7693* (2013.01)

(58) Field of Classification Search
CPC ...... B23D 47/02; B23D 45/048; B23D 47/00; B27B 5/29; Y10T 83/7693

USPC ....................... 83/581, 471.2, 471.3
See application file for complete search history.

(56) References Cited

U.S. PATENT DOCUMENTS

| 2,901,948 | A | | 9/1959 | Melling | |
|---|---|---|---|---|---|
| 3,545,826 | A | * | 12/1970 | Magee et al. | ..................... 384/43 |
| 4,152,961 | A | * | 5/1979 | Batson | .......................... 83/471.3 |
| 4,334,450 | A | | 6/1982 | Benuzzi | |
| 5,060,548 | A | * | 10/1991 | Sato et al. | ..................... 83/471.3 |
| 5,241,888 | A | * | 9/1993 | Chen | ............................ 83/471.3 |

(Continued)

FOREIGN PATENT DOCUMENTS

| DE | 202006005377 | 6/2006 |
|---|---|---|
| EP | 1690622 | 8/2006 |

(Continued)

OTHER PUBLICATIONS

Parmley, R.O. Illustrated Sourcebook of Mechanical Components. McGraw-Hill © 2000. pp. 8-19 and 20-2 and 20-3 as included in the action.*

*Primary Examiner* — Sean Michalski
(74) *Attorney, Agent, or Firm* — Woodard, Emhardt, Moriarty, McNett & Henry LLP

(57) ABSTRACT

The invention relates to a powered saw (2) of the chop saw or mitre saw form. A circular blade is mounted to be rotated and is pivotally movable between raised and lowered position via movement of a support arm (26) with respect to the base (4). The support arm (26) is mounted on a slide (12) which is received within a bearing assembly (10). Means (52, 54) are provided to prevent debris and other material from entering the bearing assembly (10) thereby ensuring accurate and smooth movement between the slide (12) and the bearing assembly (10).

12 Claims, 5 Drawing Sheets

(56) References Cited

U.S. PATENT DOCUMENTS

| | | | | |
|---|---|---|---|---|
| 5,346,313 A | * | 9/1994 | Ng | 384/43 |
| 5,524,516 A | * | 6/1996 | Sasaki et al. | 83/471.3 |
| 5,768,967 A | | 6/1998 | Sasaki et al. | |
| 5,829,882 A | * | 11/1998 | Ng et al. | 384/43 |
| 6,035,754 A | * | 3/2000 | Stumpf et al. | 83/471.3 |
| 6,918,330 B2 | * | 7/2005 | Ng et al. | 83/471.3 |
| 7,284,335 B2 | * | 10/2007 | Park et al. | 33/286 |
| 2003/0226436 A1 | * | 12/2003 | Higuchi | 83/471.3 |
| 2004/0055436 A1 | * | 3/2004 | Parks et al. | 83/471.3 |
| 2005/0098010 A1 | * | 5/2005 | Hu | 83/471.2 |
| 2005/0223571 A1 | * | 10/2005 | Park et al. | 33/286 |
| 2005/0262978 A1 | * | 12/2005 | Hetcher et al. | 83/100 |
| 2007/0074611 A1 | * | 4/2007 | Hu | 83/471.2 |
| 2008/0210074 A1 | * | 9/2008 | Higuchi | 83/471.3 |
| 2010/0162867 A1 | * | 7/2010 | McCracken et al. | 83/471.3 |
| 2010/0242699 A1 | * | 9/2010 | Sasaki et al. | 83/471.2 |

FOREIGN PATENT DOCUMENTS

| | | |
|---|---|---|
| WO | WO03082518 | 10/2003 |
| WO | WO 2005056259 | 6/2005 |

* cited by examiner

SAW WITH CIRCULAR BLADE

REFERENCE TO RELATED APPLICATIONS

This application is a divisional of U.S. patent application Ser. No. 12/669,244, filed Apr. 27, 2010, which is a national stage of International Patent Application No. PCT/GB2008/002439, filed Jul. 16, 2008, and which claims the benefit of Great Britain Patent Application No. 0713817.5, filed Jul. 17, 2007, all of which is hereby incorporated by reference.

The invention to which this application relates is a saw which is mounted on a support arm, said support arm including a motor connected to the blade to rotate the same, in operation.

The saw blade has at its peripheral edge, a series of teeth which, when the blade rotates, can be brought into contact with the work piece to be cut. The support arm is pivotally movable in at least an upwards and downwards direction about an axis substantially parallel with the axis of rotation of the blade. The support arm may also, in one embodiment, be rotatable about an axis substantially perpendicular to the axis of rotation of the saw blade to allow a bevelled or angled cut to be performed on the workpiece.

The support arm is mounted on a slide, which arm is received slide within a bearing assembly, which is in turn fixedly mounted in position with respect to a base of the saw. The base has an upper surface, on which a work piece to be cut is placed and towards and away from which the support arm can be moved so as to bring the blade into contact with the work piece to cut the same. This form of saw is commonly referred to, in different variations, as a mitre saw, compound saw or chop saw.

The applicants, in their co-pending application No. EP1690622, describes a form of saw on which the support arm is mounted with respect to one, single slide, which slide arm has at least one, but typically four, relatively planer external surface and with which the bearing assembly contacts so as to control the sliding movement in an accurate manner. Typically, the sliding movement is along the longitudinal axis of the slid so as to allow the support arm to be moved in a plane substantially parallel with the top surface of the base.

The provision of a single slide arm as opposed to the more conventional plurality of slide arms, is a significant step forward as it allows the required accuracy of cut to be achieved without the need for additional slide arms which therefore reduces the overall size of the saw apparatus and reduces the cost of manufacture, and reduces the size and cost of packaging which is required.

The aim of the present invention is to provide further improvements which allow the use of a saw having a single slide to be manufactured and used efficiently.

In a first aspect of the invention, there is provided a saw, said saw having a base, a slide mounted with respect to the base, a support arm mounted on the slide, and said slide and support arm relatively movable in a direction parallel with the longitudinal axis of the slide, said support arm including a circular blade mounted thereon for rotation when powered by a motor mounted on the support arm and wherein the support arm and slide are located with one another via a bearing assembly, and wherein on or adjacent to said bearing assembly, at at least one end thereof, there is provided a means to prevent or minimize the ingress of dust or debris from the slide into the bearing assembly.

Typically, one of said means is provided at each end of the bearing assembly.

In one embodiment, the means is a wiping component which contacts with the external surfaces of the slide, so as to remove debris or dust therefrom thereby ensuring that clean external surfaces of the slide are provided within the bearing assembly.

By providing these means, so the possibility of dust or debris blocking or snagging the movement of the slide and the bearing assembly, is substantially reduced.

In one embodiment, the bearing assembly comprises four pairs of bearings, two pairs mounted to a first side of the slide and a further two pairs mounted to the opposing side of the slide. In one embodiment, a first pair of bearings on the first side are mounted substantially vertically in line with a first pair of bearings on the opposing side of the slide and the second pair of bearings, on the first side, spaced from the first, are positioned substantially vertically in line with the second pair of bearings, spaced from the first pair, on the opposing side.

In an alternative embodiment, the bearing assembly includes three pairs of bearings, a first pair on a first side of the slide and the remaining two pairs on the opposing side of the slide. In this configuration, typically the pair on the first side of the slide, are located intermediate the locations of the first and second spaced pairs of bearings on the opposing side of the slide.

In a further alternative configuration, the bearing assembly includes at least one needle roller arrangement on the first side of the slide. In one embodiment, first and second pairs of bearings are provided on the opposing side or alternatively, a further needle roller bearing assembly is provided.

Typically the first side of the slide is the top side and the opposing side is the bottom or lower side of the slide.

Typically, the slide is secured at one end to the support arm and is slidably received so as to move along the bearing assembly which is provided in a fixed relationship with respect to the base.

In one embodiment, the support arm is mounted to the slide, via a pivot mechanism which allows the pivotal movement of the support arm between raised and lowered positions so as to allow the blade to be brought into storage and in-use positions respectively.

In one embodiment, the bearing assembly is mounted on a holder which itself is pivotally movable with respect to the base and therefore allows movement of the support arm connected thereto with respect to the base, about an axis which is substantially perpendicular to the axis of rotation of the blade.

Typically, the support arm is mounted with respect to the slide, via an elongate member, which member extends from substantially one end of the slide to the end at which the support arm is positioned, and said member extends into a receiver connected to the support arm.

Typically, the elongate member is threaded at its free end so as to allow the same to be threadedly inserted into the receiver and, at the opposing end, is provided with means to allow the member to be rotated in the first and second directions to allow the location and dislocation of the support arm with and from the slide.

Typically, the said end of the elongate member is located within a recess in an end member mounted on the slide.

Specific embodiments of the invention will now be described with reference to the accompanying drawings, wherein.

Figure 1:
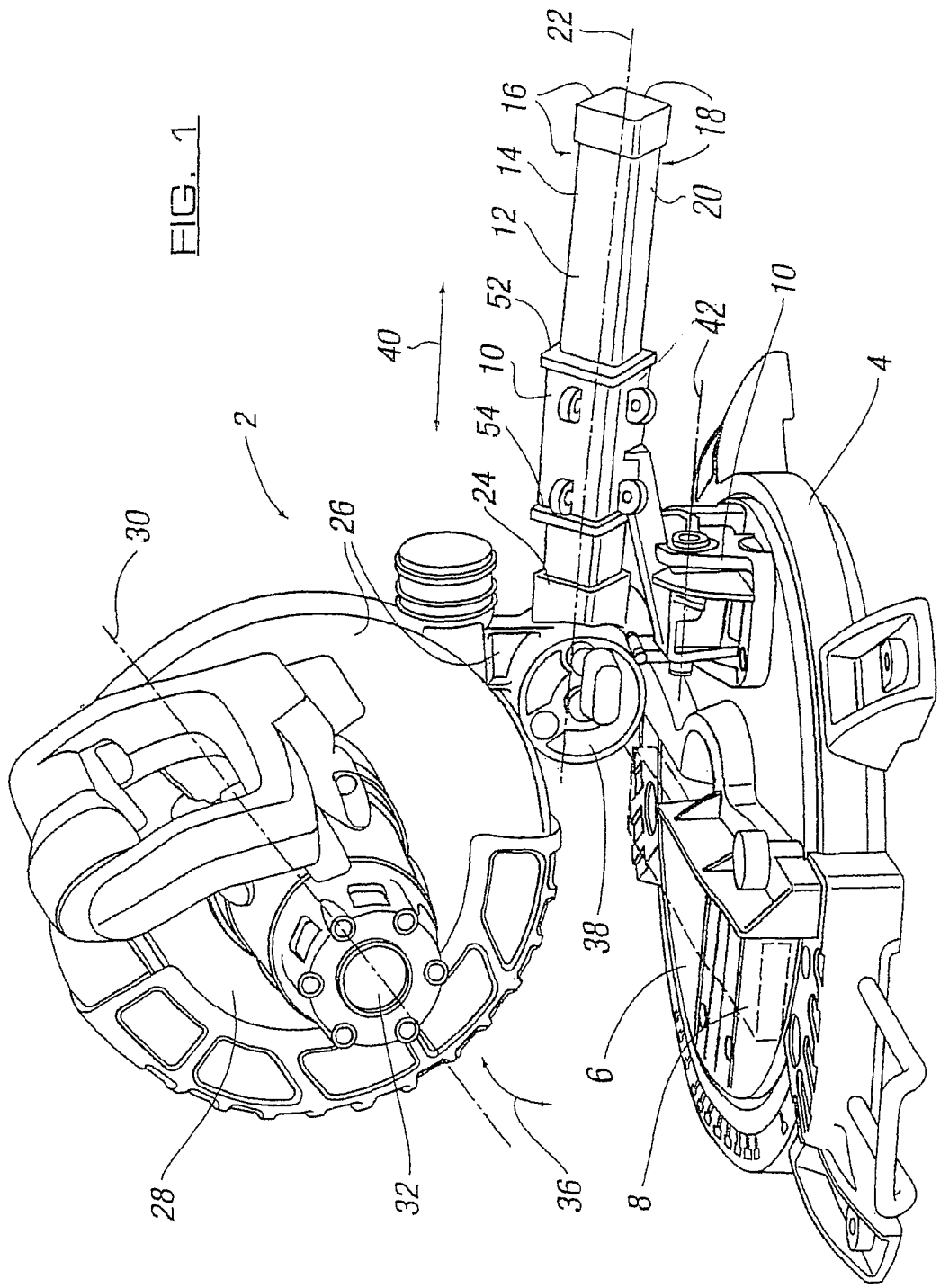
FIG. 1 illustrates a mitre saw in accordance with one embodiment of the invention, with a single profiled slide.

Referring firstly to FIG. 1, there is illustrated a saw 2 in accordance with one embodiment of the invention. The saw, in this case, is a mitre saw and comprises a base 4 with a upper surface 6 on which a work piece, to be cut using the saw, is positioned and which is shown in broken lines. To the rear of the base, is provided a mounting assembly 8 which includes as an integral part thereof a bearing assembly 10 which will be described in more detail subsequently.

The bearing assembly receives and allows movement therealong, of a single, profiled slide 12 which has, in this embodiment, four planar external surfaces 14, 16, 18, 20 each of which is contacted by at least one bearing within the bearing assembly.

The slide has a longitudinal axis 22 and has mounted, at a first end 24, a support arm 26.

The support arm includes a circular blade which is enclosed by guard assembly 28 which is provided for rotation about an axis 30 when it is driven by a motor 32 also mounted on the support arm. The drive of the blade, the provision of the motor, and the provision of guard mechanisms for the blade, can all be provided in a conventional manner and therefore will not be described in detail here.

In use, the support arm can be pivotally moved between raised and lowered positions as indicated by arrow 36, about the pivot assembly 38 which is connected as part of the support arm and to the end 24 of the slide. In this embodiment, the support arm and slide are therefore effectively an integral unit and the slide and support arm are movable as indicated by arrow 40 towards and away from the base.

In this embodiment, the support arm and slide are also pivotally movable about pivot axis 42, to allow the angle of cut which is achieved using the circular blade to be adjusted by the user such as to create a mitre cut.

The use of a single slide, as opposed to a plurality of slides, means that the assembly of the saw can be made more efficient, the overall size of the finished product is reduced and therefore reduces packaging costs and furthermore, there are a reduced number of components used, thereby further reducing the material usage.

Figure 2:
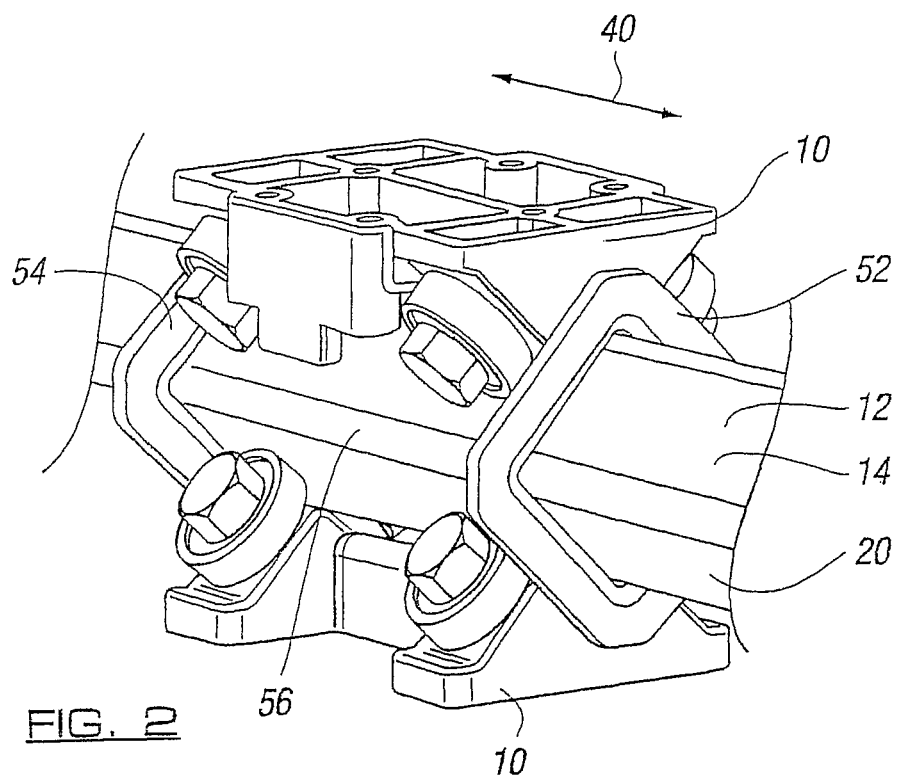
FIG. 2 illustrates a detail of a bearing assembly which can be used with a saw of the type shown in FIG. 1, in one embodiment.

In order to achieve the effective provision of the single slide, there is a need to ensure that the bearing arrangement between the bearing assembly and the slide, is efficient and to this end, and as shown in FIG. 2, wiping means 52, 54 are provided at respective opposing ends of the bearing assembly 10. The provision of the wiping means ensures that as the slide moves along the bearing, as indicated by the arrow 40, the outer surfaces of the slide are cleaned so as to remove dust or debris from the said surfaces, prior to that portion 56 of the slide intermediate the components 52, 54 entering the bearing assembly. This therefore minimises the opportunity for dust or debris to create blockage or snagging of the sliding movement or to create any inaccuracies in the sliding movement.

Figure 3:
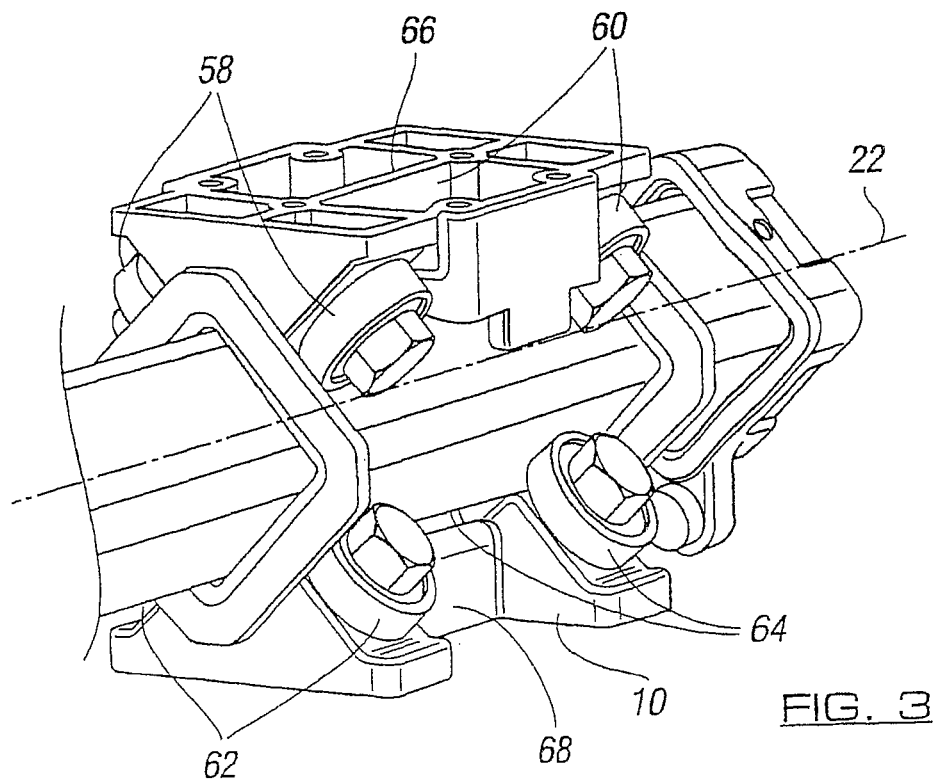
FIG. 3 illustrates an alternative embodiment of a bearing assembly which can be used in accordance with the invention.

With respect now to the FIG. 3, there is shown a first embodiment of a bearing arrangement and, in this case, the bearing arrangement comprises four pairs of bearings 58, 60, 62, 64. Each pair of bearings is mounted on either the top plate 66 or the bottom plate 68, which plates are in turn mounted so as to ensure that the same are fixedly located with respect to the base. In the embodiment shown in FIG. 3, four pairs of bearings are used with, two pairs 58, 60 mounted on the top plate 66 and two pairs 62, 64, mounted on the bottom plate 68. The plates and bearings are also arranged such that respective first pairs of bearings 58, 62 are mounted vertically in line and the second pairs of bearings 60, 64 are mounted respectively in line and the first and second pairs of bearings 58, 60 and 62, 64 are spaced apart along the longitudinal axis 22 of the slide so as to ensure that the required support for the slide is achieved.

Figure 4:
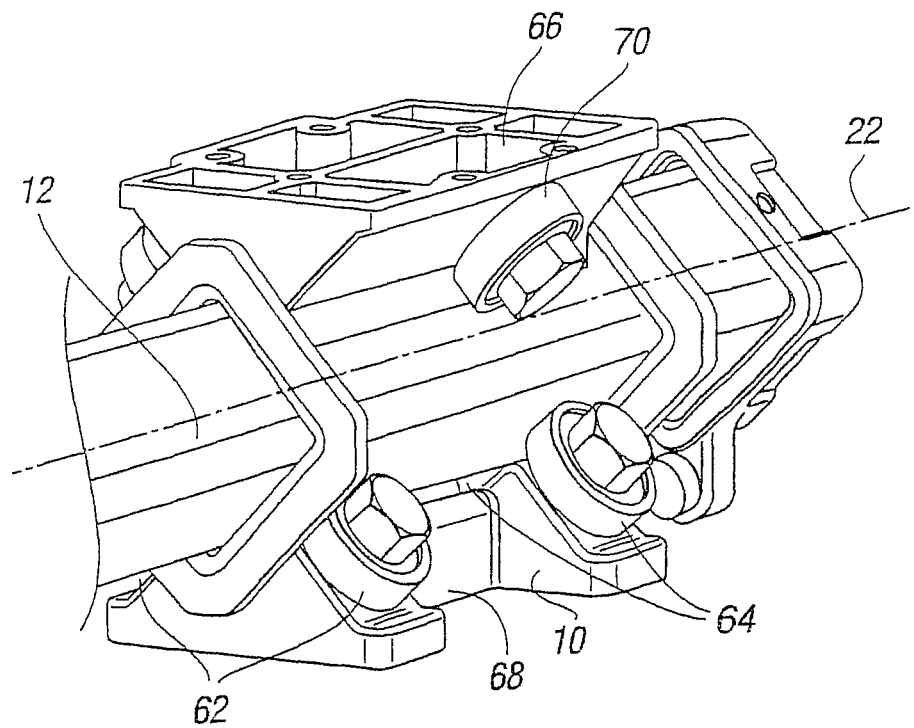
FIG. 4 illustrates a further arrangement of a bearing assembly which can be used in accordance with the invention.

FIG. 4 shows an alternative arrangement of a bearing assembly in which one pair of bearings 70 are provided on the top plate 66 and two pairs of bearings 62, 64 are provided on. the bottom plate 68 so that six bearings in total are used. In this case, the top pair of bearings are provided in location so as to be equi-spaced along the longitudinal axis from the spaced first and second pairs of bearings on the bottom plate.

Figure 5:
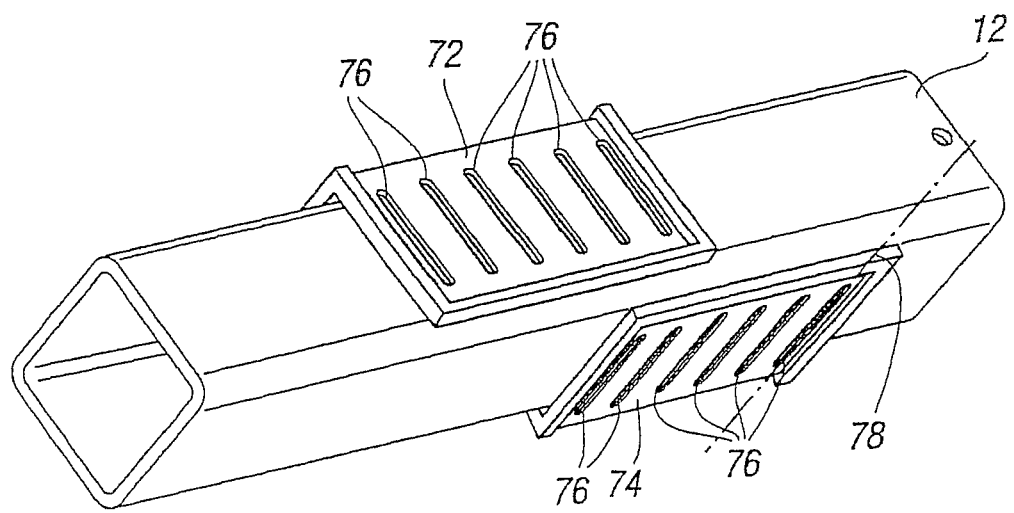
FIGS. 5 and 6 illustrate a fixing arrangement in accordance with the invention to allow the support arm to be fixed to a slide.

FIG. 5 illustrates a yet further embodiment of the invention in which top and bottom plates 72, 74 are provided with a plurality of needle bearings 76, each of which are rotatable about the respective longitudinal axis 78.

Figure 6:
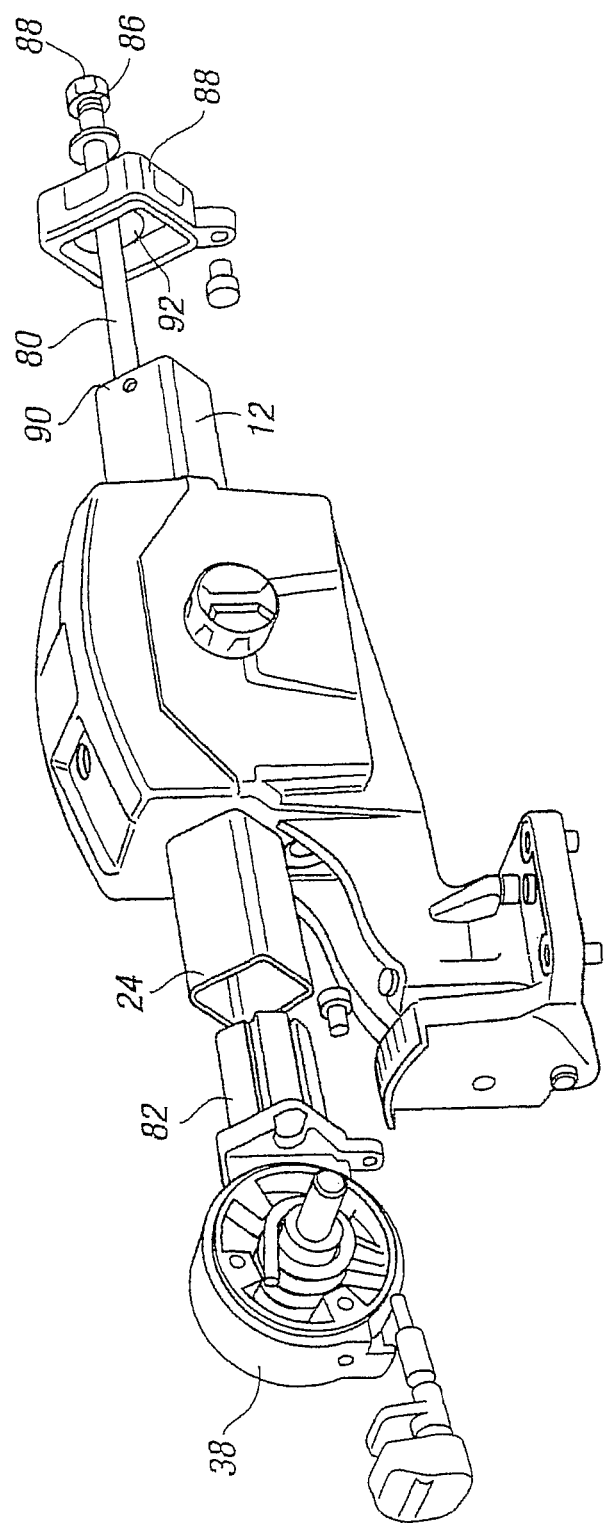
Figure 7:
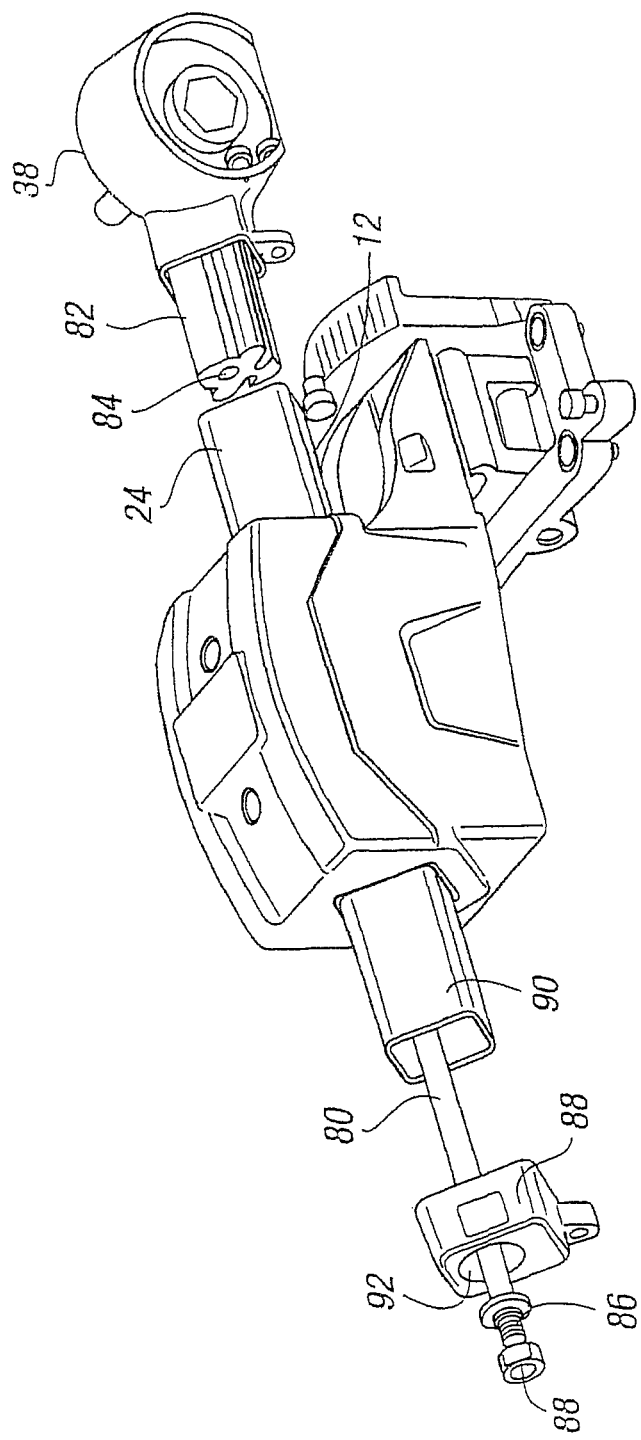
FIG. 7 illustrates a further arrangement in accordance with the invention in one embodiment.

Turning now to FIGS. 6 and 7, there is provided an example of the manner in which the support arm 26 is located on the slide 12 in the preferred embodiment. This is achieved by providing an elongate member 80, which has a first end which is threaded and which passes into a threaded aperture 84 in a receiver 82 mounted on the pivot assembly 38 which is in turn connected to the supporting arm 26 (not shown). The opposing end 86 of the elongate member, in this case, includes a bolt head which can be rotated so as to draw the support arm receiver 82 inside the hollow slide and thereby clamp the pivot assembly 38 to the end 24 of the slide. Typically, a mounting plate 88 is provided at the opposing end 90 of the slide which is recessed 92 to house the bolt head. This therefore means that the support arm is held in a clamped position with regard to the slide end 24 rather than the internal side walls of the slide which improves the strength and reliability of the connection.

There is therefore provided an efficient and effective saw assembly in which the use of a single slide rather than a plurality of slides which allows the controlled directional movement of the support arm on which the blade is mounted, while at the same time reducing the components and side of the saw and reducing the packaging required to house the saw.

The invention claimed is:

1. A saw, said saw having a base, a single hollow slide mounted with respect to the base, said slide having a plurality of planar external surfaces, a bearing assembly with opposite ends and having bearings located between said opposite ends contacting each of said planar external surfaces supporting said slide extending through said opposite ends, a support arm mounted on the slide, and said slide and support arm relatively movable in a direction parallel with the longitudinal axis of the slide, said support arm including a circular blade mounted thereon for rotation when powered by a motor mounted on the support arm, the support arm and slide are located and movably mounted via said bearing assembly with respect to said base, and on or adjacent to said bearing assembly, at at least one end thereof, there is provided a means mounted at said opposite ends of said bearing assembly to prevent some contamination of dust entering through said opposite ends from the slide into the bearing assembly by contacting and wiping dust off of said planar surfaces located outwardly of said bearing assembly as said slide moves through said opposite ends of said bearing assembly, and the support arm is mounted with respect to the slide via an elongate member which member extends through the interior of the slide from substantially one end to the other end at which the support arm is positioned, and said member extends into a receiver connected to the support arm, said elongate member is threaded at its free end so as to allow the same to be threadedly inserted into the receiver and, at the opposing end, rotating means provided to allow it to be rotated in first and second directions to allow the location and dislocation of the support arm with and from the slide.

2. A saw according to claim 1 characterised in that the bearing assembly comprises a plurality of pairs of bearings.

3. A saw according to claim 2 characterised in that the bearing assembly includes two pairs of bearings mounted to a first side of the slide and a further two pairs of bearings mounted to the opposing side of the slide.

4. A saw according to claim 3 characterised in that a first pair of bearings on the first side are mounted substantially vertically in line with a first pair of bearings on the opposing side of the slide and the second pair of bearings on the first side, spaced from the first pair of bearings, are positioned substantially vertically in line with the second pair of bearings on the opposing side.

5. A saw according to claim 2 characterised in that the bearing assembly includes three pairs of hearings, a first pair on a first side, of the slide and the remaining two pairs on the opposing side of the slide.

6. A saw according to claim 5 characterised in that the pair of bearings on the first side of the slide, are located intermediate the locations of the first and second spaced pairs of bearings on the opposing side of the slide.

7. A saw according to claim 1 characterised in that the bearing assembly includes at least one needle roller arrangement on the first side of the slide.

8. A saw according to claim 7 characterised in that first and second pairs of bearings or a further needle roller arrangement is provided on the opposing side.

9. A saw according to claim 1 characterised in that the slide is secured at one end to the support arm and is slidably received so as to move along the bearing assembly which is provided in a fixed relationship with respect to the base.

10. A saw according to claim 1 characterised in that the support arm is mounted to the slide, via a pivot mechanism which allows the pivotal movement of the support arm between raised and lowered positions so as to allow the blade to be brought into storage and in-use positions respectively.

11. A saw according to claim 1 characterised in that the bearing assembly is mounted on a holder which itself is pivotally movable with respect to the base and therefore allows movement of the support arm connected thereto with respect to the base, about an axis which is substantially perpendicular to the axis of rotation of the blade.

12. A saw according to claim 1 characterised in that the said end of the elongate member is located within a recess in an end member mounted on the slide.

* * * * *